United States Patent [19]
Vogt

[11] Patent Number: 5,190,073
[45] Date of Patent: Mar. 2, 1993

[54] PRESSURE REGULATING INLET-AND-OUTLET VALVE

[75] Inventor: Rolf Vogt, Oftersheim, Fed. Rep. of Germany

[73] Assignee: Firma Carl Freudenberg, Weinheim/Bergstrasse, Fed. Rep. of Germany

[21] Appl. No.: 781,782

[22] Filed: Oct. 23, 1991

[30] Foreign Application Priority Data

Jan. 5, 1991 [DE] Fed. Rep. of Germany ....... 4100166

[51] Int. Cl.⁵ ............................................. F16K 31/12
[52] U.S. Cl. .................................... 137/493; 137/807; 137/827; 137/909
[58] Field of Search ............... 137/493, 827, 807, 909

[56] References Cited

U.S. PATENT DOCUMENTS

| 2,735,515 | 2/1956 | Cloudsley | 137/493 |
| 3,701,357 | 10/1972 | Granström et al. | 137/827 |
| 3,845,782 | 11/1974 | Nicholls et al. | 137/493 |
| 4,655,237 | 4/1987 | Gloor et al. | 137/807 |
| 4,671,679 | 6/1987 | Heshmat | 277/17 |

FOREIGN PATENT DOCUMENTS 2114763  6/1970  Fed. Rep. of Germany ...... 137/493

OTHER PUBLICATIONS

"Magring Seal, Design and Users Guide", Servoflo Corporation, Sep. 1983.

Primary Examiner—A. Michael Chambers
Attorney, Agent, or Firm—Sprung Horn Kramer & Woods

[57] ABSTRACT

A pressure regulating inlet-and-outlet valve for a sealed space enclosed by a housing wall (10). The wall is penetrated by at least one gap (6) that is spanned by a magnetic field and completely occupied by a ferrofluidic liquid (7) confined inside the gap by the field.

7 Claims, 3 Drawing Sheets

PRESSURE REGULATING INLET-AND-OUTLET VALVE

BACKGROUND OF THE INVENTION

The invention concerns a pressure regulating inlet-and-outlet valve for a space or vessel enclosed by a wall or barrier and sealed off from the outside.

Such pressure regulating inlet-and-outlet valves are well known in the art. Spring-loaded check valves, for example, are used to limit the pressure in sealed spaces in a housing or vessel.

The conventional ball-and-spring check valves have a number of drawbacks. They require several parts that move in relation to one another with narrow tolerances within a valve housing. Furthermore, both over and under pressure cannot be compensated with one and the same valve. These valves react relatively inertly to differences in pressure, and it is impossible to provide for a constant pressure within narrow limits.

SUMMARY OF THE INVENTION

The principal object of the present invention is to improve a pressure regulating inlet-and-outlet valve such that it will have few parts, be simple, sturdy, cost-effective to manufacture, and will react substantially without delay in response to very slight differences in both excess and under pressure.

This object, as well as other objects which will become apparent from the discussion that follows, are achieved, in accordance with the present invention, in a pressure regulating inlet-and-outlet valve of the aforesaid type by providing a valve seal formed by at least one gap spanned by a magnetic field and completely occupied by a "ferrofluidic liquid" (magnetic fluid) confined within the gap by the field. Ferrofluidic seals can withstand a certain difference in pressure. The maximum pressure difference at which the seal will continue to function properly can be determined by appropriate design—e.g., the height of the gap between the core and, for example, one pole shoe of a magnet. The valve seal in accordance with the invention can thus be used to regulate even very slight pressure differences, on the order of 0.02 bars.

At a critical excess or over-pressure the ferrofluidic liquid in the valve seal will uncover a very narrow gap, and the confined and compressed gas (e.g., air) will flow out. At a critical under pressure, due to cooling for example, the valve seal will open in the opposite direction and fresh gas (e.g., air) will enter the housing from the environment. Critical over and under pressures can be very precisely defined, resulting in very precisely controlled pressures within the housing or vessel to which the valve is connected.

One advantage of the valve in accordance with the invention over the known embodiments (such as ball-and-spring check valves) is that very slight differences in both over and under pressure can be compensated with only a single valve component. With respect to the valve's function it should be noted that it will remain open only until the excess pressure has been released. Once the critical situation is compensated, the valve will close again, confining noxious or unpleasant gases in the housing and away from the environment. Foreign contaminants penetrating inside the valve through the inlet/outlet, for example, cannot pass through the ferrofluidic liquid accumulated between the core and the pole shoe. This is especially true of water, which does not mix with ferrofluidic liquid.

Another advantage of the inlet-and-outlet valve according to the invention is that it is easy to clean and to add fresh ferrofluidic liquid.

One preferred embodiment of the present invention has a condenser on the side of the gap facing away from the space being sealed. This component condenses the escaping gas and collects it in a reservoir. The condensed material can be returned to the sealed space through a line.

In order to control larger over and under pressures within a housing it is possible to provide a plurality of gaps arranged in series. The series of gaps makes it possible to use the valve in various applications with different pressures on a modular basis. When the pressure differences are great, the gap can be simply elongated.

The gap can be straight and demarcated on one side by a magnet and on the other by a piece of iron. Manufacture is therefore especially simple. The gap can also be annular.

This approach makes it possible to accommodate a long gap in a narrow space. A labyrinth seal can be positioned upstream toward the space being sealed. Inexpensive known labyrinth seals are available in a wide range of dimensions and can be employed. Although the ferrofluidic liquid will not mix with the liquid found in the space being sealed, a labyrinth seal will provide extra protection against drops of ferrofluidic liquid being forced out of the gap and lost. A rebound plate, for example, can be employed instead of a labyrinth seal and will constitute a cost-effective and effective protector for the ferrofluidic seal.

The labyrinth seal can have at least one drain opening into the space being sealed. The drain will make it possible to subject the ferrofluidic seal to the over pressure prevailing in the space being sealed and for the medium that flows through the labyrinth to return to that space. A rebound plate can also be positioned upstream of the ferrofluidic seal and be provided for practical purposes with drains.

The gap in one advantageous, preferred embodiment of the invention is accommodated in an insert that can be secured to the wall of a housing as a ready to use unit. This design is of particular advantage in view of the economics of manufacturing the wall next to the valve. If the insert screws into the wall and is sealed off from it, no special demands on the dimensional stability of the housing will be necessary. The precise width of the gap between the annular magnet and its core can more easily be established in an insert. When a ready-to-use unit screws into a housing, it is also possible to withstand even comparatively high pressures in comparatively thin-walled housings by employing a plurality of gaps in series.

The magnetic field can be generated by a permanent magnet that demarcates one side of an annular or straight gap. The magnets are magnetized axially and can be secured to two pole shoes that conduct the magnetic flux to the core. This construction is of particular advantage from the aspect of economics when the permanent magnet is a bar magnet accommodated next to a plate of magnetizable material, in conjunction with which it creates a straight gap.

The magnetic field in another preferred embodiment is generated by an electromagnet. In this arrangement it is of advantage to employ the electromagnet to generate a variable and optionally very powerful field, resulting in a better and more precise match between the magnetic forces confining the ferrofluidic liquid and the demands of the particular application—thus providing a variable level of pressure retention.

The preferred embodiments of the present invention will now be described with reference to the accompanying drawings.

DESCRIPTION OF THE PREFERRED EMBODIMENTS

Figure 1:
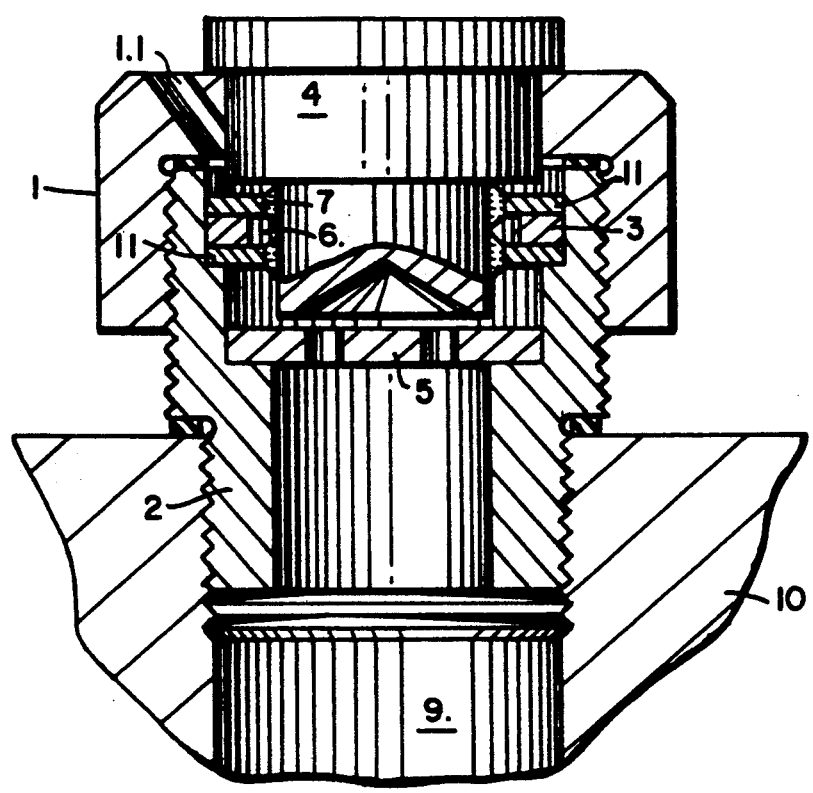
FIG. 1 is a cross-sectional view of an inlet-and-outlet valve with a rebound plate upstream of the gap.

The pressure regulating inlet-and-outlet valves illustrated in FIGS. 1 through 4 consist essentially of four components. A sealed housing 1 has at least one air inlet and outlet 1.1 and is preferably made from a non-magnetic material such as brass or, even more ideal from the aspect of economy, plastic. An insert 2, threaded, for example, and screwed into a vessel housing wall 10, is also preferably made of brass or plastic. A ferrofluidic seal comprises an axially magnetized annular magnet 3 and two pole shoes 11 that convey the magnetic flux to a core 4. The purpose of the magnetic core 4 is to couple the magnetic flux to pole shoes 11 and to accordingly ensure that a ferrofluidic liquid 7 is confined within a gap 6. The liquid 7 can be a suspension of particles of metal in oil.

The insert 2 illustrated in FIG. 1 accommodates a rebound plate 5 that protects the gap 6 from liquid such as oil splashing out of a space 9 that is being sealed. The housing 1 and core 4 in this embodiment are in two parts, making it possible, for example, to use one and the same housing with inserts and cores that have been lengthened to accommodate a plurality of gaps 6 arranged in series.

Figure 2:
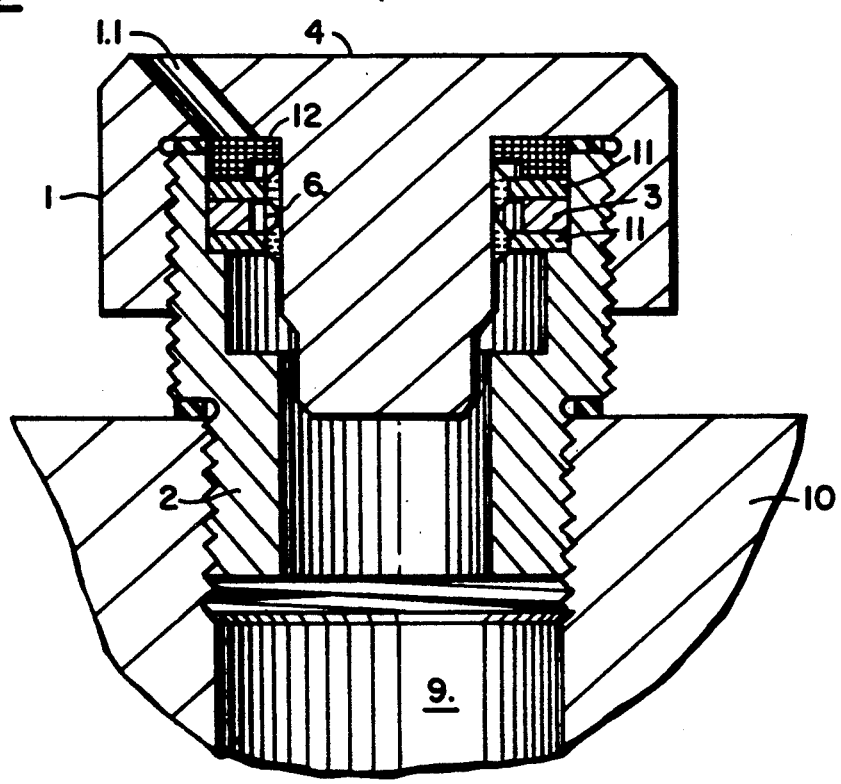
FIG. 2 is a cross-sectional view of an inlet-and-outlet valve, similar to the valve of FIG. 1 but with a sealing gap upstream of the ferrofluidic seal and with an activated carbon filter inside the air inlet and outlet.

FIG. 2 illustrates an inlet-and-outlet valve in accordance with the invention similar to the valve illustrated in FIG. 1 but with the magnetic core 4 and sealed housing 1 in one piece. The core in this version also protects the ferrofluidic seal. This unit, which essentially comprises only four components, is particularly recommended for the manufacture of a single type of inlet-and-outlet valve on a large industrial scale. This embodiment also includes an activated carbon filter 12 concentrically accommodated in the insert 2 and positioned directly upstream of the inlet and outlet 1.1 in the housing 1.

The filter 12 is designed to prevent direct contact with the ferrofluidic liquid. The material must also be made of a material that will not draw the ferrofluidic liquid from the sealing gap between the pole shoe 11 and the core 4. The activated carbon filter 12 can, for example, also be axially separated from its adjacent pole shoe. The filter mitigates the detrimental action of the gases escaping through the gap 6 before they can enter the atmosphere through inlet and outlet 1.1.

Figure 3:
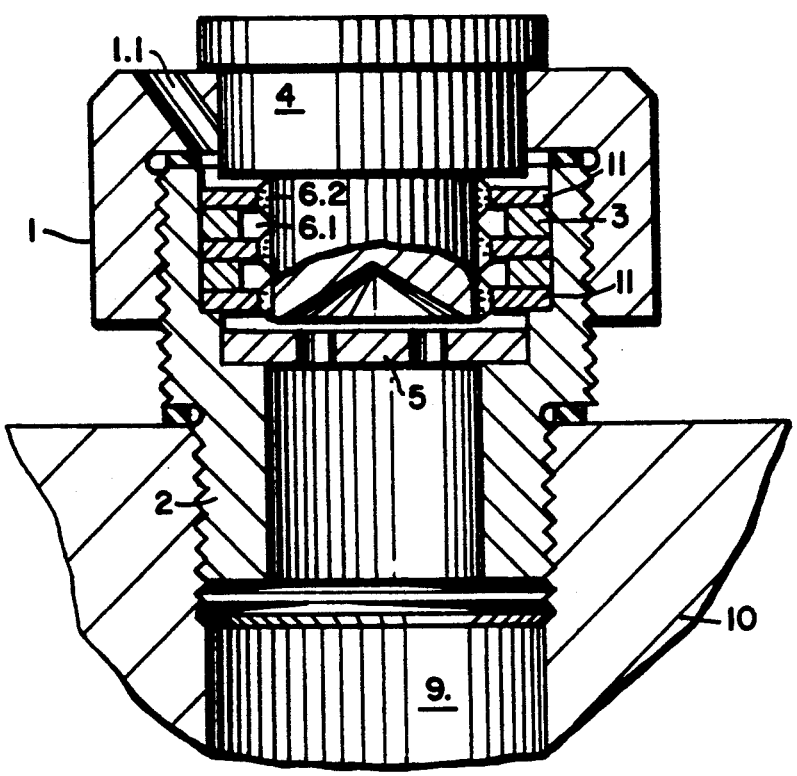
FIG. 3 is a cross-sectional view of an inlet-and-outlet valve with two gaps arranged in series.

FIG. 3 illustrates an inlet-and-outlet valve that is essentially identical with the valve illustrated in FIG. 1, although it is intended to withstand higher and lower pressures and is accordingly provided with a series of two gaps 6.1 and 6.2. The components of this valve are substantially identical in design with those of the valve illustrated in FIG. 1 with the exception that the core 4 and insert 2 are axially longer. This minor change is of particular advantage from the aspect of economy.

Figure 4:
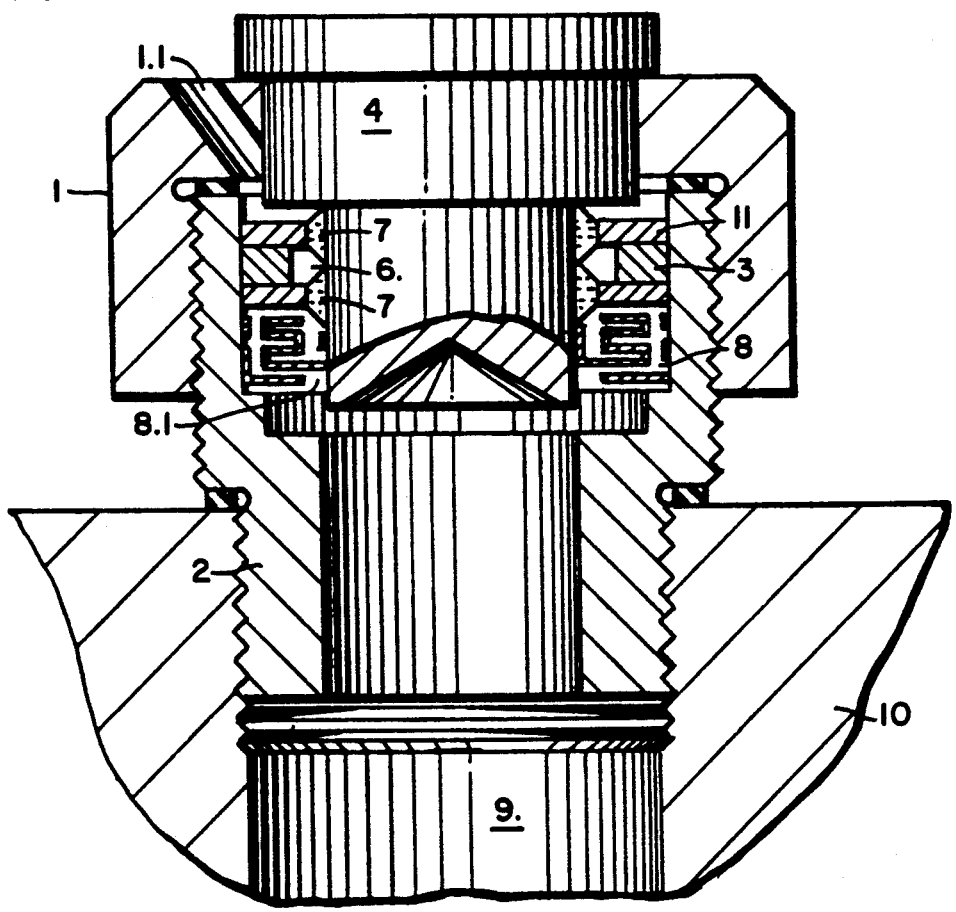
FIG. 4 is a cross-sectional view of an inlet-and-outlet valve with a labyrinth seal arranged upstream toward the space being sealed.

The inlet-and-outlet valve illustrated in FIG. 4 has an annular gap 6. Ferrofluidic liquid 7 is protected by a labyrinth seal 8. Labyrinth seal 8 is provided with a drain 8.1 that opens into the space 9 being sealed. The labyrinth seal is positioned upstream of the gap 6 toward the space 9. Labyrinth seals are in themselves known and exist in enough different shapes and sizes to be economical for industrial-scale valve production.

Figure 5:
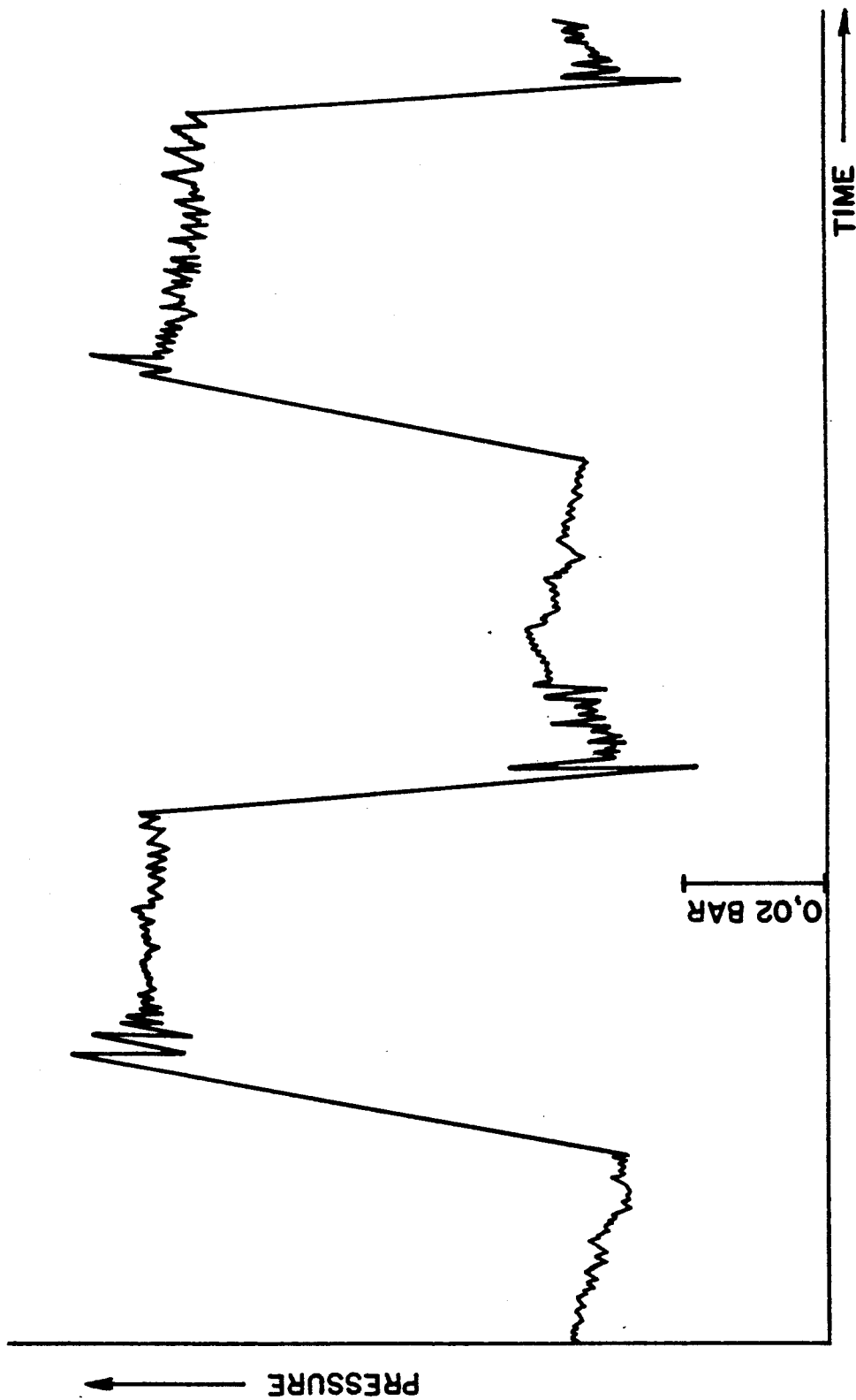
FIG. 5 is a graph of the distribution of pressure in an inlet-and-outlet valve according to the invention.

FIG. 5 is a graph of pressure (vertical axis) vs. time (horizontal axis) illustrating how the inlet-and-outlet valve works. Variations in pressure are plotted in terms of varying temperature, which pressure may oscillate around the atmospheric pressure for example.

As the temperature inside the sealed space 9 increases, the pressure will also increase up to a precisely prescribed threshold. As the temperature continues to increase, ferrofluidic liquid 7 will uncover a narrow gap 6, between a pole shoe 11 and the core 4 of the magnet for example, allowing gas to escape through inlet and outlet 1.1 and compensating the pressure. Ferrofluidic liquid 7 will thereafter completely occupy the gap 6 again, sealing the space 9 off from the environment. The opposite procedure will occur when the pressure inside the space decreases. The valve will seal off the space until the pressure decreases to a precisely prescribed lower threshold. A gap 6 will then open in the ferrofluidic seal and allow gas (e.g., air) to flow in from the environment until the pressure is compensated, at which time the valve will close again. The pressures will be compensated to a narrow tolerance, which can be established at precisely 0.02 bars. The advantage is that one and the same pressure regulating inlet-and-outlet valve can be employed to compensate very slight over and under pressures. The valve will remain open until the maximal allowable pressure is established again. If conditions remain stable, the valve will close, confining noxious or unpleasant gases to the sealed space. A valve in accordance with the invention will respond very rapidly to minimal pressure differences. It is simple in design, easy to clean, and very precisely adjustable.

There has thus been shown and described a novel pressure regulating inlet and outlet valve which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a pressure regulating, inlet-and-outlet valve for controlling the pressure of a first fluid medium within a sealed space enclosed by a housing wall, the improvement wherein the wall is penetrated by at least one annular gap that is spanned by a magnetic field produced by magnetic field generating means and completely occupied by a second ferrofluidic liquid medium confined inside the gap by the field.

2. The inlet-and-outlet valve defined in claim 1, wherein said gap includes a plurality of gaps arranged in series.

3. The inlet-and-outlet valve defined in claim 1, further comprising a labyrinth seal arranged upstream of the gap and toward the sealed space.

4. The inlet-and-outlet valve defined in claim 3, wherein the labyrinth seal has at least one drain that empties into the space being sealed.

5. The inlet-and-outlet valve defined in claim 1, wherein the gap is accommodated in an insert that can be secured to the wall as a ready to use unit.

6. The inlet-and-outlet valve defined in claim 1, wherein the magnetic field is generated by a permanent magnet.

7. The inlet-and-outlet valve defined in claim 1, wherein the magnetic field is generated by a electromagnet.

* * * * *